Jan. 13, 1953 G. C. HUGHES 2,624,980
PILOT OPERATED FLUID PRESSURE REGULATOR
Filed June 30, 1950 2 SHEETS—SHEET 1

INVENTOR.
GEORGE C. HUGHES
BY
Bates, Teare, & McBean
ATTORNEYS

Jan. 13, 1953   G. C. HUGHES   2,624,980
PILOT OPERATED FLUID PRESSURE REGULATOR
Filed June 30, 1950   2 SHEETS—SHEET 2

INVENTOR.
GEORGE C. HUGHES
BY
Bates, Teare, v McBean
ATTORNEYS

Patented Jan. 13, 1953

2,624,980

UNITED STATES PATENT OFFICE 2,624,980

PILOT OPERATED FLUID PRESSURE REGULATOR

George C. Hughes, Anderson, Ind., assignor to Reynolds Gas Regulator Company, Anderson, Ind., a corporation of Indiana Application June 30, 1950, Serial No. 171,496

5 Claims. (Cl. 50—11)

1

This invention relates to improvements in fluid pressure regulators. The invention is particularly concerned with the provision of a fluid pressure regulator for use in gas distribution systems which will maintain a constant reduced pressure under various flow conditions and wherein the high pressure, under control of the pressure at regulator outlet, is utilized to actuate the regulator mechanism. These, therefore, are the general objects of the present invention.

A more specific object of the present invention is to provide a fluid pressure regulator of the pressure responsive diaphragm type for use in gas distribution systems, which regulator will be provided with a pilot including a supplemental flexible diaphragm which, in response to the pressure at the outlet side of the main regulator, will supply fluid from the high pressure side of the main regulator to the diaphragm thereof, thus operating the diaphragm of the main regulator directly from the high pressure side of the regulator in response to pressure and flow demands at the low pressure side of the regulator. The invention is further concerned with the provision of an improved mechanism which will act automatically to relieve the operating pressure on the diaphragm of the regulator when the demand on the regulator for an increased supply has been met.

Other objects and advantages of this invention will become more apparent from the following description, reference being had to an embodiment of the invention illustrated in the accompanying drawings. The essential features of the invention will be summarized in the claims.

Figure 1:
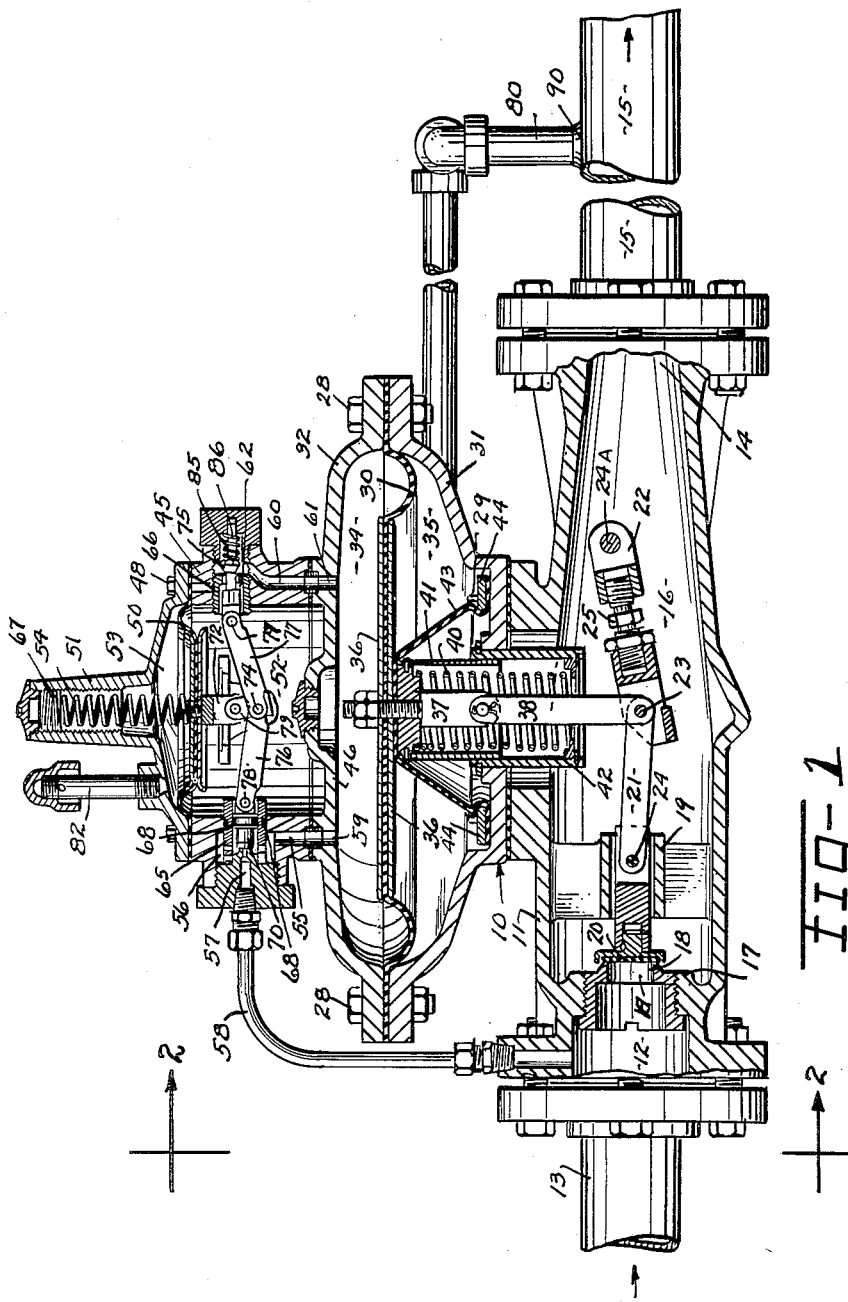
Figure 2:
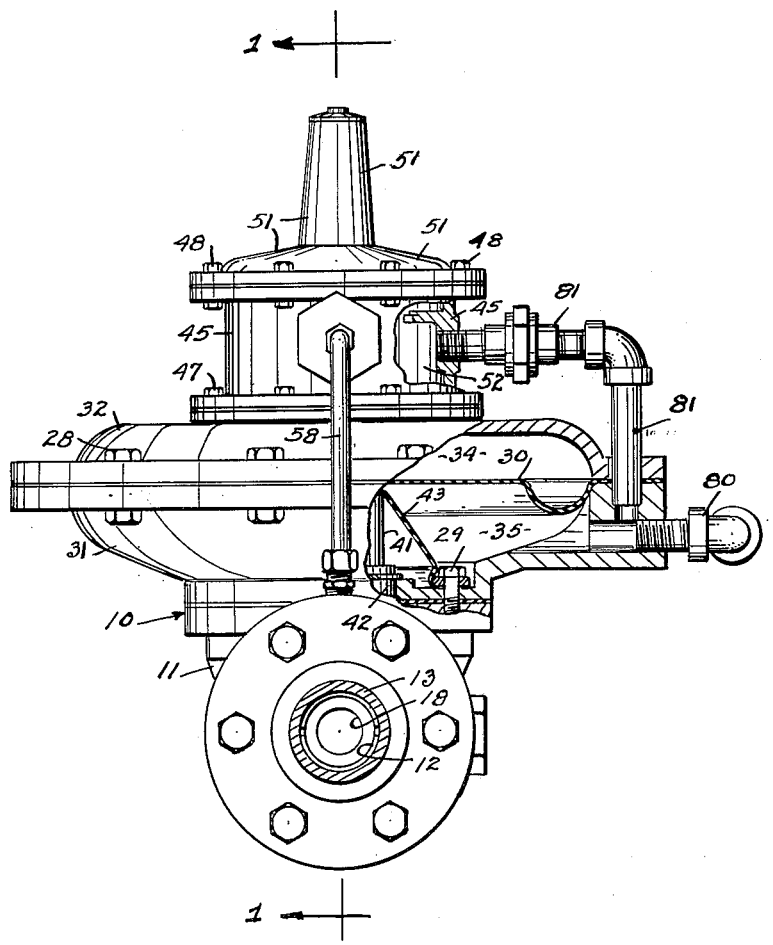

In the drawings, Fig. 1 is a centrally located vertical section of the regulator, the plane of the section being indicated by the lines 1—1 on Fig. 2; Fig. 2 is a vertical section taken in a plane transverse to that of Fig. 1 and which is indicated by the lines 2—2 on Fig. 1, a portion of the regulator being broken away to more clearly illustrate the internal construction thereof.

Referring now to the drawings and particularly to Fig. 2, it will be seen that the improved regulator includes a regulator body 10 provided with a portion 11 having a high pressure inlet 12 and a low pressure outlet 14. The inlet is adapted to be connected by a conduit 13 with a source of high fluid pressure supply, while the outlet 14 is adapted to be connected with a low pressure line or service conduit 15. The body portion 11 is provided with a passageway 16 extending from the inlet to the outlet thereof and a partition wall 17 which extends across the pas-

2 sageway and is provided with a valve port opening 18 through which the fluid must pass. The body portion 11 is provided with a guide 19 in which a valve 20 is mounted for movement to and from the valve port 18.

The valve 20 is actuated by a pair of toggle links 21 and 22 which are pivotally interconnected as at 23. The link 21 is pivotally connected to the valve 20 as at 24, while the link 22 is pivotally mounted on a pin 24A carried by the body 10. One of the links, preferably the link 22, is extensible, as indicated at 25, to adjust the relative angular position and length of the two toggle links.

The valve 20 is controlled by a flexible diaphragm 30. This diaphragm is mounted between two hollow portions 31 and 32 of the body 10 which are secured together by bolts 28 and to the body portion 10 by bolts 29. The diaphragm 30 divides the body 10 into upper and lower chambers 34 and 35. The upper chamber 34 comprises a loading or valve opening pressure chamber, while the lower chamber 35 comprises a valve closing pressure chamber. The diaphragm 30 is shown as mounted between a pair of rigid discs 36 and carries a downwardly projecting stud 37 which is pivotally connected by a link 38 with the toggle pivot 23 heretofore mentioned. Accordingly, the movement of the diaphragm 30 controls the opening and closing of the valve 20.

The diaphragm 30 is biased toward a closed position by a spring 40. This spring is mounted within a pair of telescoping tubes. The upper tube 41 is secured to the diaphragm 30, and the lower tube 42 is secured to the body member 31. The passage of fluid from the passageway 16 to the chamber 35 is prevented by a relatively small flexible diaphragm 43. The upper end of this diaphragm is secured to the diaphragm 30, and its lower end is clamped to the body member 31 by a clamping ring 44 which is held in place by the bolts 29.

A pilot valve is mounted atop the casing 32. This pilot valve comprises a substantially cylindrical portion 45 of the body 10 which is secured to the body portion 32 by bolts 47. The body portion 45 is closed at its lower end by the upper wall 46 of the body portion 32 and is closed at its upper end by a flexible pilot or supplemental diaphragm 50. The diaphragm 50 is secured in place by a hollow cap 51, thus providing a chamber 52 below the diaphragm and a chamber 53 thereabove.

The body portion 45 is provided with a fluid passageway 55, the central portion of which is enlarged to provide expansion chamber 56. The passageway 56 has an inlet orifice 57 which is connected by a tube or conduit 58 with the high pressure inlet 12 of the main regulator body portion 11. The passageway 55 has a low pressure outlet 59 which communicates with the loading chamber 34 of the main regulator. The casing 45 of the pilot valve is provided with a second passageway 60, the inlet 61 of which communicates with the loading chamber 34 of the main regulator, and the outlet 62 of which communicates with the chamber 52 of the pilot regulator. A pair of valve guideways 65 and 66 are mounted in the walls of the casing 45. The guideway 65 carries a valve member 70 which controls the flow of fluid through the passageway 55, while the guideway 66 carries a valve member 75 which controls the flow of fluid through the relief passageway 60. The passageway 60 is normally closed by its valve member 75 through the action of a coil spring 86. Suitable packing material 68 disposed between the guideway 66, the body 45 and the valve member 70, prevents passage of fluid from the high pressure passageway 55 into the pilot valve chamber 52.

The position of the valve member 70 is controlled by the flexible pilot diaphragm 50 in response to the pressure at the low pressure or outlet side of the main regulator. As shown in the drawings, a conduit 80 is connected with the outlet conduit of the main regulator and with the main regulator chamber 35, namely the valve closing pressure chamber. The chamber 35 is connected with the chamber 52 of the pilot regulator by a conduit 81. Thus the pressure in the chamber 52 is responsive to changes in the pressure of the outlet conduit 15.

The supplemental diaphragm 50 is preloaded by a spring 54 carried by the cap 51. The pressure exerted on the diaphragm 50 by this spring is adjusted by an adjusting nut 67 carried by the cap 51.

The pilot diaphragm carries a stud 72 which is connected by a link 73 with a pivot 74 which interconnects a pair of toggle links 76 and 77. The link 76 is pivotally connected as at 78 with the valve member 70 while the link 77 is pivotally connected as at 79 with the valve member 75. The chamber 53 above the diaphragm 50 is vented to atmosphere by a breather pipe 82. Thus it will be seen that as the pressure in the chamber 52 decreases, the diaphragm 50 will drop under the action of its loading spring 54, thus opening the valve 70. During this time the valve 75 is maintained closed by a compression spring 85.

When the pressure in the chamber 52 increases due to an increase of pressure in the outlet conduit 15 of the main regulator, the diaphragm 52 will rise causing the valve 70 to close. The spring 86 acts to maintain the valve 75 closed until such time as the valve 70 is closed by the operation of the diaphragm 50. As soon as the valve member 70 is closed, the reaction of this valve against its seat causes any further increase in pressure in the chamber 52 to act on the diaphragm 50 and actuate the toggle linkages 76 and 77 to open the valve 75. This places the chamber 34 in communication with the chamber 52 and the outlet conduit 15 of the main regulator, by reason of the conduits 80 and 81, thus relieving the pressure in the chamber 34.

In operation the inlet pressure or high pressure of the main regulator, which is connected by the conduit 58 with the passageway 55 of the supplemental or pilot regulator, is reduced to the required loading pressure at the valve orifice 57 leading into the expansion chamber 56 of such passageway. This loading pressure is controlled by adjustment of the pressure of the spring 54 on the pilot diaphragm 50, thereby permitting the regulator to be set to maintain the desired delivery pressure.

Normally the forces in operation at the pilot regulator are those of the pilot spring 54, which acts downwardly against the diaphragm 50 and, the outlet or low pressure set up in the pilot chamber 52 which acts in an upward direction against such diaphragm. The high pressure has no effect whatsoever upon the diaphragm 50 as it is restricted from entering the pilot chamber by the wall of such chamber and the packing 68.

The loading pressure supplied at the expansion chamber 56 of the pilot is transmitted directly to the loading or opening pressure chamber 34 and exerts its pressure downward on the diaphragm 30 of the main regulator. This develops sufficient pressure to overcome the action of the main regulator shut-off spring 45 and the down stream or low pressure in the chamber 35, and causes the diaphragm 30 to act, through the toggle mechanism 21 and 22, to open the main valve 20 whereupon the main regulator will deliver the desired outlet pressure and capacity.

When a demand is created for an increase in capacity, it results in a momentary drop in pressure in the outlet conduit 15 due to the position of the main valve and the pipe friction at the point 90 at which the outlet pressure is taken by the conduit 80. The supplemental or pilot diaphragm 50, under the influence of such drop in pressure, will drop. This causes the toggle mechanism 77, 76 to open the valve 70 and thus increase the pressure in the loading chamber 34 of the main regulator. The increased loading pressure in the chamber 34, being higher than the original load pressure thereon will cause the main valve 20 to open further to thereby meet the demand for increased capacity and thus maintain a constant delivery pressure.

Where the demand for increased capacity in the down stream conduit 15 has been sufficiently satisfied, a momentary increase in pressure at such point will result. This momentary increase in pressure causes an increased pressure in the chamber 52 to exert an upward force against the pilot diaphragm 50, thus closing the pilot valve 70, and opening the pilot relief valve 75. The opening of the relief valve 75 bleeds the loading pressure from the chamber 34 through the passageway 60, the chamber 52, and the conduits 81 and 80 to the low pressure side of the main regulator. The loading pressure thus reduced in the chamber 34, the main regulator shut-off spring 40 and the pressure of the chamber 35 within the main diaphragm 30 results in an upward force on the diaphragm and causes such diaphragm to reposition the main regulator valve 19 so as to overcome the momentary pressure increase and thus assure a maximum delivery pressure in capacity.

I claim:

1. A fluid pressure regulator comprising, a body having a main fluid passageway and a supplemental fluid passageway, each having a high pressure inlet and a low pressure outlet, a main valve and a supplemental valve to control the flow of fluid through respective passageways, said body having a main cavity and a supplemental cavity, a main diaphragm and a supplemental diaphragm extending across respective cavities, operating connections between respective valves and diaphragms to move the valves in response to the movement of their diaphragms, resilient means to bias the main diaphragm to a valve closing position, resilient means to bias the supplemental diaphragm to a valve opening position, the supplemental diaphragm dividing its cavity into a valve closing pressure chamber and an atmospheric chamber, the main diaphragm dividing its respective cavity into a valve closing pressure chamber and a valve opening pressure chamber, means connecting the high pressure inlets of each passageway with a common source of high fluid pressure, passageways connecting the valve closing chambers with each other and with the low pressure outlet of the main passageway, the supplemental passageway outlet opening directly into the opening pressure chamber of the main diaphragm, a passageway connecting the last mentioned chamber with the supplemental valve closing chamber, a relief valve to control the flow of fluid through the last named passageway, and means acting automatically in response to movement of the supplemental diaphragm to open said relief valve following the closing of the supplemental valve and to close said relief valve prior to the opening of the supplemental valve.

2. A fluid pressure regulator comprising, a body having a main fluid passageway and a supplemental fluid passageway each having a high pressure inlet and a low pressure outlet, a main valve and a supplemental valve to control the flow of fluid through respective passageways, said body having a main cavity and a supplemental cavity, each cavity having a diaphragm extending thereacross, a connection between each diaphragm and its respective valve to move the respective valves in response to the movement of the diaphragms, resilent means to bias the main diaphragm to a valve closing position, resilient means to bias the supplemental diaphragm to a valve opening position, the supplemental diaphragm dividing its cavity into a valve closing pressure chamber and an atmospheric chamber, the main diaphragm dividing its cavity into a valve closing pressure chamber and a valve opening pressure chamber, means connecting the high pressure inlets of each passageway with a source of high fluid pressure, passageways connecting the valve closing chambers with each other and with the low pressure outlet of the main passageway, said supplemental passageway outlet being in direct communication with the opening pressure chamber of the main valve, a passageway connecting the last mentioned chamber with the supplemental valve closing chamber, a valve to control the flow of fluid through the last named passageway, resilient means biasing said last named valve to a closed position and means connecting the last named valve with the supplemental diaphragm to cause the valve to tend to open as the supplemental valve closes and to close as the supplemental valve opens, and wherein said last named biasing means acts to hold the last named valve closed until the supplemental valve is closed.

3. A fluid pressure regulator comprising, a body having a main fluid passageway and a supplemental fluid passageway, each passageway having a high pressure inlet and a low pressure outlet, a main valve to control the flow of fluid through the main passageway, a supplemental valve to control the flow of fluid through the supplemental passageway, said body having a main cavity and a supplemental cavity, each cavity having a diaphragm extending thereacross, a connection between the main diaphragm and the main valve, a connection between the supplemental diaphragm and the supplemental valve, said connections serving to move their respective valves in response to the movement of the respective diaphragms, resilient means to bias the main diaphragm to a valve closing position, resilient means to bias the supplemental diaphragm to a valve opening position, the supplemental diaphragm dividing its cavity into a valve closing pressure chamber and an atmospheric chamber, the main diaphragm dividing its cavity into a valve closing pressure chamber and a valve opening chamber, means connecting the high pressure inlets of each passageway with a common source of high fluid pressure, an outlet conduit connected with the low pressure outlet of the main valve passageway, passageways connecting the valve closing chambers with each other and with said conduit at a point remote from said main passageway, said supplemental passageway outlet being in direct communication with the opening pressure chamber of the main valve, a passageway connecting the last mentioned chamber with the supplemental valve closing chamber, a valve to control the flow of fluid through the last named passageway, a spring biasing said last named valve to a closed position and means connecting the last named valve with the supplemental diaphragm to cause the valve to tend to open as the supplemental valve closes and to close as the supplemental valve opens, and wherein said spring acts to close such last named valve before the supplemental valve opens.

4. In a fluid pressure regulator, a body having a main passageway and a supplemental passageway each having a high pressure inlet and a low pressure outlet, a conduit connecting the low pressure inlets, a valve in each passageway to control the flow of fluid therethrough, said body having a main cavity and a supplemental cavity, the supplemental chamber having a flexible diaphragm separating it into a valve closing chamber and an atmospheric chamber, the main cavity having a flexible diaphragm separating it into a valve closing pressure chamber and a valve opening pressure chamber, connections between respective valves and diaphragms to move the valves in response to the movement of the diaphragms, an outlet conduit connected with the outlet of the main passageway, a passageway connecting the closing chambers of the diaphragms with each other and with the outlet conduit at a point spaced from the main passageway, said supplemental passageway outlet being in direct communication with the opening chamber of the main diaphragm, means to relieve the pressure in the main diaphragm opening chamber including a relief passageway, a normally closed relief valve to control the flow through the relief passageway and means including the connection between the supplemental diaphragm and the supplemental valve to open said relief valve consequent upon an increase in pressure in the supplemental valve closing chamber following the closing of the supplemental valve and to close the relief consequent upon a predetermined drop in pressure in said chamber and prior to the opening of the supplemental valve.

5. In a fluid pressure regulator having an inlet and an outlet, a main valve to control the flow of fluid from the inlet to the outlet, a pressure responsive main diaphragm connected to said valve to control the movement thereof, resilient means acting on said diaphragm and tending to close said valve, and a pressure chamber associated with said diaphragm, a pilot pressure regulator to supply fluid pressure to said diaphragm pressure chamber to open said valve, said pilot including a body having a passageway provided with a high pressure inlet and a low pressure outlet, said body having a cavity spaced from said passageway, a flexible pressure responsive diaphragm extending across said cavity and coacting with said body to provide a second pressure chamber separated from said passageway, a conduit connecting the low pressure outlet of the pilot with the first named pressure chamber, a relief passageway connecting the first named pressure chamber with said second pressure chamber, a pair of substantially aligned guideways extending from said second chamber to respective passageways, a pressure valve mounted in one guideway and movable away from said chamber to close the first named passageway, a relief valve mounted in the other guideway and movable toward said chamber to close said relief passageway, a pair of pivotally interconnected toggle links in said pilot chamber, a pivotal connection between said links and said relief and pressure valves respectively, and an operating connection between said toggle links and said pilot diaphragm to straighten the links as the pressure in the pilot chamber increases, resilient means biasing said pilot diaphragm toward said toggle links, a conduit connecting the pilot chamber with the regulator outlet, a spring normally acting to close said relief valve, said spring having sufficient force to overcome the force required to close the pressure valve whereby the pressure valve will close before the relief valve opens and the relief valve will close before the pressure valve opens, and means to prevent the passage of fluid through the pressure valve guideway.

GEORGE C. HUGHES.

REFERENCES CITED

The following references are of record in the file of this patent:

UNITED STATES PATENTS

| Number | Name | Date |
| --- | --- | --- |
| 2,273,111 | Kindl | Feb. 17, 1942 |
| 2,334,496 | Kindl | Nov. 16, 1943 |
| 2,365,713 | MacLean | Dec. 26, 1944 |